United States Patent [19]

Gnekow

[11] Patent Number: 4,888,189
[45] Date of Patent: Dec. 19, 1989

[54] SIMULTANEOUS DOUBLE REVERSE OSMOSIS PROCESS FOR PRODUCTION OF LOW AND NON-ALCOHOLIC BEVERAGES

[75] Inventor: Barry R. Gnekow, Los Gatos, Calif.

[73] Assignee: Ariel Vineyards, Inc., San Jose, Calif.

[21] Appl. No.: 86,265

[22] Filed: Aug. 17, 1987

[51] Int. Cl.$^4$ ............................................. C12G 3/08
[52] U.S. Cl. ................................. 426/231; 210/652; 426/592
[58] Field of Search ................ 210/652, 644; 426/14, 426/592, 330.4, 231

[56] References Cited

U.S. PATENT DOCUMENTS

| | | | |
|---|---|---|---|
| 3,133,132 | 5/1964 | Loeb et al. | 264/49 |
| 4,401,678 | 8/1983 | Beaumont | 426/15 |
| 4,405,652 | 9/1983 | Boucher | 426/592 |
| 4,499,117 | 2/1985 | Bonneau | 426/592 |
| 4,532,140 | 7/1985 | Bonnome | 426/592 |
| 4,581,236 | 4/1986 | Bandel | 426/14 |
| 4,610,887 | 9/1986 | Galzy | 426/330.4 |
| 4,612,196 | 9/1986 | Goldstein | 426/14 |
| 4,617,127 | 10/1986 | Light | 426/592 |
| 4,664,918 | 5/1987 | Tilgner | 426/14 |
| 4,681,767 | 7/1987 | Weiss | 426/14 |
| 4,711,723 | 12/1987 | Bray | 210/652 |
| 4,724,079 | 2/1988 | Sale | 210/652 |
| 4,775,538 | 10/1988 | Boucher | 426/14 |

FOREIGN PATENT DOCUMENTS 6633474 9/1975 Australia.
717847 12/1972 Belgium.
2133418A 12/1983 United Kingdom.

OTHER PUBLICATIONS

Wuchterpfennig & Neubert in Brauwelt No. 47 (1976), Chemical Abstracts 86(3): 15164f (1987).

*Primary Examiner*—Carolyn Paden
*Attorney, Agent, or Firm*—Jacques M. Dulin, Esq. The Dulin Law Firm

[57] ABSTRACT

Simultaneous double reverse osmosis process for production of low and non-alcoholic beverages, particularly wines, from any traditionally fermented table wine feedstock. A portion of the feed wine is subjected to remove alcohol and water as a permeate, with recycle of the concentrated retentate, while simultaneously a volume-balanced amount of reverse osmosis water is input back into the feed tank to maintain the inprocess wine at the initial level of the feedstock wine. The process may be run batch-wise, alternately, or in a modified semi-continuous operation to produce non-alcoholic wines (wines having residual alcohol content of less than 0.01% by volume) low alcohol wines (less than 0.5 volume percent alcohol), or wines having reduced alcohol content (less than 11-13 volume percent). The process also overcomes the 5% alcohol barrier problem of conventional reverse osmosis. The resulting finished wine has flavor, aroma and color solids concentrations of a level acceptable in good commercial practice.

10 Claims, 1 Drawing Sheet

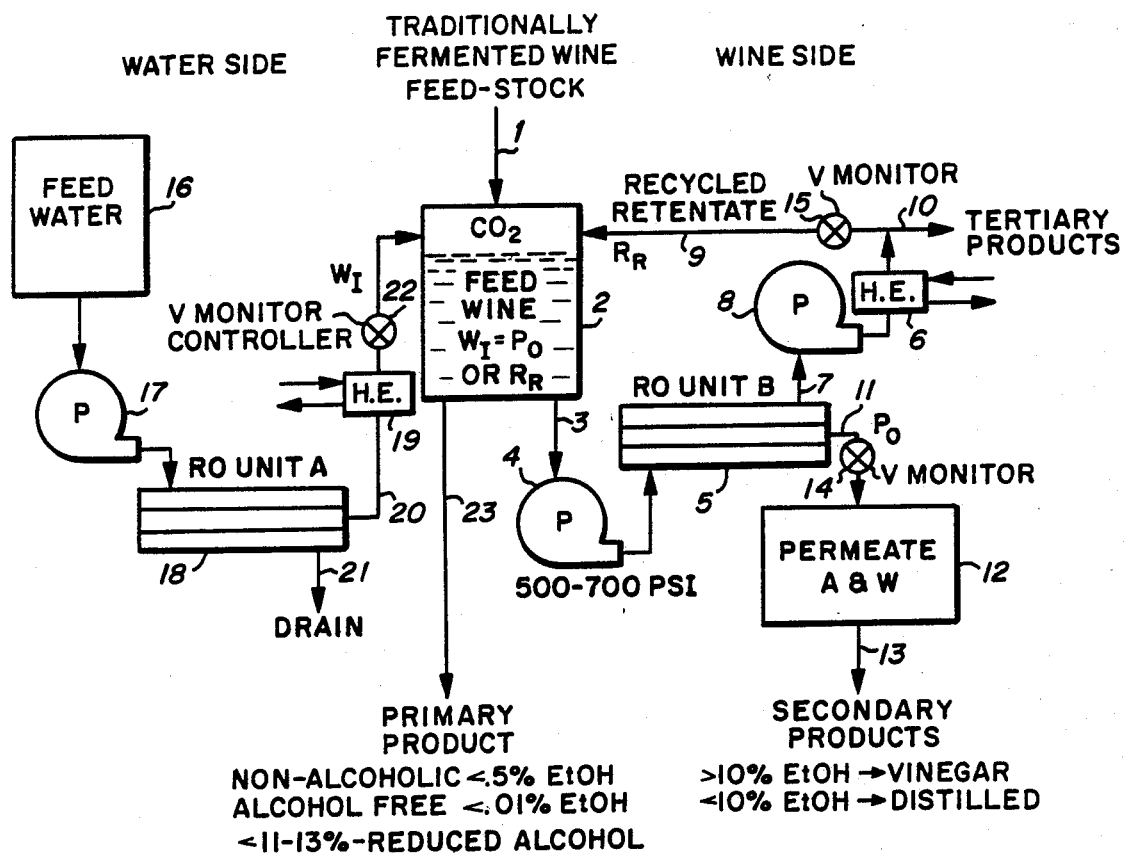

SIMULTANEOUS DOUBLE REVERSE OSMOSIS PROCESS FOR PRODUCTION OF LOW AND NON-ALCOHOLIC BEVERAGES

FIELD

The invention relates to a simultaneous double reverse osmosis process for production of beverages, particulary wines, having a reduced level of alcohol from any traditionally fermented table wine as a feedstock. All of the feed wine is subjected to reverse osmosis to remove alcohol and water as a permeate, with recycle of the concentrated retentate, while simultaneously or alternately a volume-balanced amount of reverse osmosis water is input back into the feed tank to maintain the initial level of the feedstock wine. The resulting finished wine has flavor, aroma and color solids concentration acceptable in good commercial practice. The process may be run batch-wise, or in a modified semi-continuous operation to produce non-alcoholic wines (wines having residual alcohol content of less than 0.5% by volume), alcohol free wines (less than 0.01% volume percent alcohol), or wines having reduced alcohol content (less than 11-13 volume percent volume). The process also overcomes the 5% alcohol barrier problem.

BACKGROUND

Non-alcoholic fermented beverages such as wines have become of great interest because they offer traditional wine flavor without the unhealthful and sociably objectionable side effects of the alcohol. However, until the present invention there has been no process for producing non-alcohoic fermented beverages of flavor, aroma and color solids equivalent to traditional alcohol-containing beverages.

Non-alcoholic wines have been marketed for a number of years, but the techniques applied in the production of these wines have produced off-flavors in the efforts to remove all of the alcohol. For example, the alcohol can be distilled off, but in the process the wine is cooked or at least de-natured and most of the wine flavor and aromatics are driven off or altered. Another method is to reduce alcohol content is by dilution with water. This results in a "thin" taste which one can expect from a watered-down wine or other fermented beverage.

Reverse osmosis, as it has been recently has proved satisfactory only in connection with producing lowered alcoholic content beverages (down to about 5-6%), but not completely non-alcoholic beverages. This is in large part due to the low alcohol barrier problem encountered in reverse osmosis processes. When the alcohol content of a beverage being processed by reverse osmosis drops to about 5% by volume alcohol, the reverse osmosis membrane rejects the alcohol, i.e. it will not pass through freely. This "barrier" phenomenon makes removal of alcohol to below 5% by volume by conventional reverse osmosis almost impossible.

Wuchterpfennig & Neubert in Brauwelt No. 47 (1976), as reported in Chemical Abstracts 86 (3):15164 f (1987), disclosed partial dealcoholization of beer by reverse osmosis using a celluose acetate membrane having a salt rejection value of 90-96% at high pressure in a plate-type unit. The alcohol was reduced from 40.1 g/L to 17.0 g/L.

Bonneau in U.S. Pat. No. 4,499,117 (1985) used an ultrafiltration membrane having a separation threshold of 10,000 daltons under low pressure, followed by a single reverse osmosis step applied to the ultrafiltrate permeate using a Degremont brand osmoser of aromatic polyamid hollow fibers having a molecular weight pass level of about 250, followed by evaporation and distillation under vacuum (0.015 atmospheres) at low temperature (45 degrees C). The wine is reduced from 12-13 degrees Gay Lussac to about 5 degrees GL. Lyophillization may also be employed to produce a dessicated concentrate to form a dry beverage mix.

Goldstein et al. in U.S. Pat. No. 4,612,916 (1986) applied reverse osmosis to wine and malt beverages using a Patterson Candy International (Great Britain) brand RO unit employing a ZF 99 membrane and succeeded in reducing beer from 3.7% by weight to 1.25-1.85% by weight. The ZF-99 membrane used was a polyamid polysulfone-supported TFC rated for pressures up to 900 psi. Goldstein also compared the TFC membrane to a cellulose acetate membrane.

Beaumont in U.S. Pat. No. 4,401,678 (1983) used ultrafiltration on both grape juice and wine fermented therefrom. In prooessing grape juice, the ultrafiltration unit employed a molecular weight cutoff of 175-200 for the purpose of removing methyl anthranilate and other objectional "foxy" flavors present in Labrusca-type wine grapes. Water was added to the grape juice retentate at a flow rate of approximately the same as the flow rate of filtrate, but only until 25-75% of the initial volume of juice passes through the membrane. The retentate retains the same volume and the same amount of sugar for subsequent fermentation. The wine resulting from the fermentation had decreased flavor and lowered Labrusca Flavor Index. Beaumont also ultrafiltrated fermented wine using the same permeable membrane to concentrate the wine to a volume of 25-75% of the initial volume with the same alcohol content as the feedstock wine, the concentrate thus having a intensified color and lowered LFI. No water was added to the wine concentrate. The ultrafiltration was run at approximately 500-1000 psi at 15-20 degrees C., and reportedly decreased LFI by at least about 50%. The membrane type was not disclosed. The term reverse osmosis in this patent apparently was intended to include both ultrafiltration and diafiltration.

Madsen, in Australian patent application 66334/74 published Sept. 25, 1975, teaches that heat concentration causes irreversable changes to grape juice which are detrimental to the quality of wine produced from the concentrated juice. Madsen concentrates grape juice by reverse osmosis using cellulose acetate membranes. The resulting grape juice was concentrated down to 60% of original volume, and had higher sugars and lower acid content.

Keufner, in U.K. patent application GB Pat. No. 2,133,418A published July 25, 1984, describes a process of concentrating beer and wine by passing it through a reverse osmosis semipermeable membrane, and later adding liquid to form a reconstituted beverage. The reconstituting water can be reverse osmosis treated water from which up to 99% of the minerals hav been removed. The membrane was a TFC consisting of a cross-linked polymeric amine composited on a polymeric support. The reverse osmosis system was operated at a temperature in the range of about −2% to about 40 degrees C. and at pressure of from about 100-1100 psig in a non-oxidizing atmosphere provided by the presence of carbon dioxide. The reconstituting water is added after completion of the reverse osmosis process. Approximately 45% of the alcohol and 75% of the water was removed from the beer in the process. The resulting beer contained 2.3% alcohol by weight. Of three samples produced, one had a slight burnt note in the aroma, and another sample was quite thin indicating not enough bodying ingredients remained after dilution. These can be characterized as light beers with low alcohol content.

Guinness Company's Belgian Pat. No. 717,847 (Dec. 1968) employed reverse osmosis under a non-oxidating atmosphere to produce a concentrate for export which is reconstituted with locally produced alcohol. The preferred membrane was cellulose acetate as taught by U.S. Pat. No. 3,133,132. Also mentioned as membrane materials were polyvinyl acetate and polyacrylates. This patent teaches post-shipment reconstituting to the same volume with alcohol and water, or with water alone to get a non-alcoholic or almost entirely non-alcoholic beverage.

Accordingly, there is a need in the art to provide a process for production of low and non-alcoholic wines which retain all of the traditional wine aromas and flavors at full strength without dilution of the wine, and also remove the objectionable alcohol content.

THE INVENTION

Objects

It is among the objects of this invention to provide a method of producing low and non-alcoholic fermented beverages, and particularly wines, by a process which does not affect the flavor or aroma components of the beverages yet removes the objectionable alcohol content.

It is another object of this invention to provide a process which produces a non-alcoholic wine that does not involve a net dilution of the wine flavoring, color solids and fragrance components in order to achieve the no-alcohol level.

It is another object of this invention to use a cold reverse osmosis process of removing the alcohol from a traditional wine or other fermented beverage to the non-alcohol level, less than about 0.5% alcohol, or to the alcohol free level, less than about 0.01% alcohol, without any processing other than reverse osmosis and without increase in volume of the final wine, thereby resulting in a wine indistinguishable from traditional wine in taste, aroma and color solids even when judged by professionals.

It is another object of this invention to provide an improved reverse osmosis process to obtain superior results in a low or non-alcoholic wine product without dilution of the wine.

It is another object of this invention to provide a reverse osmosis process which simultaneously balances the water loss from the retentate in order to maintain the feedstock beverage volume.

It is another object to produce a method of overcoming the low alcohol barrier phenomenon in reverse osmosis, particularly as applied to production of non-alcoholic wines or other fermented beverages.

Still other objects of the invention will be evident from the specification and claims which follow.

SUMMARY

This invention comprises simultaneous double reverse osmosis of any traditionally fermented beverage feedstock. While reference herein is made to wine, the process is equally applicable to other fermented beverages such as beer, ale stout, perrys and the like. The feedstock wine is subjected to reverse osmosis to remove alcohol and water as a permeate. The concentrated retentate is recycled to the feed tank. Simultaneously a volume-balanced amount of reverse osmosis water is input back into the feed tank to maintain the original volume of the feedstock wine. This continues until the desired removal of alcohol is achieved in the finished wine. All of the original feedstock is processed and reverse osmosis water is added to replenish the volume of water plus alcohol removed from the amount of recycled retentate or inprocess wine.

In a second embodiment, the retentate can be passed to a holding tank until a pre-determined amount of retentate is collected. The reverse osmosis of the wine feedstock is stopped, and both the retentate and the balanced volume of reverse osmosis makeup water is input back into the feed tank. Then the partially dealcoholized feedstock wine, termed in process wine (or other beverage), is again subjected to reverse osmosis. The alternate cycles of the process are repeated until the desired removal of alcohol content is reached.

The process may be run batch-wise, or in a modified semi-continuous operation to produce alcohol-free wines, which are defined herein as wines having residual alcohol content of less than 0.01% by volume. By way of contrast, ordinary orange juice has an alcohol content in excess of 0.01%. The process can be run over any desired period of time to produce wines having alcohol of a lower than normal content, that is, wines defined as having less than from 11 to 13% by volume alcohol content. For example, the process can produce non-alcoholic wines, wines having an alcohol content of below about 0.5 volume percent.

In actual independent blind taste tests by experts, a non-alcoholic wine produced by this process has received a gold medal in direct competition against traditional alcoholic wines. The finished wines produced in accordance with this invention retain flavor, aroma and color solids of traditional wines at concentrations acceptable in good commercial practice, but the alcohol is reduced to less than 0.5% by volume.

Secondary and tertiary products can also be produced in the process. The secondary products comprise the alcohol and water permeate, which is classifiable as a distilled spirit under the tax laws. The tertiary products comprise the concentrate. The concentrate can be shipped long distances at low cost, and the wine reconstituted to original volume, flavor and aroma with specially treated water. Or it can be used as a feedstock for production of reduced, low or non-alcoholic wine coolers, seltzer-type drinks, and other beverages.

The secondary permeate products can include alcohol and water permeate containing 10% or more alcohol by volume as feedstock for vinegar production. Permeates having an alcohol content below about 10% can be used as distiller's feedstock for production of raw grain alcohol, brandies and the like.

The method of this invention overcomes the problem of alcohol rejection at about the 5% alcohol level. While I do not wish to be bound by theory, I believe that because the process of this invention maintains the original feedstock relative volume, the alcohol is relatively more dilute. At the same flow rate this may provide enough time for the alcohol molecules to interact with the membrane, becoming properly oriented to pass through it. In conventional reverse osmosis, water is added only after processing. Thus, as the retentate recirculates through the conventional process in the 2nd, 3rd ... nth pass through the reverse osmosis unit, the alcohol is at comparatively higher concentration. Thus, the process of this invention also results in being able to maintain good membrane pressure levels without experiencing excess "bounce back" of the alcohol molecules at the 5% level. In conventional reverse osmosis, pressure is usually increased to overcome the 5% alcohol barrier. However, with increased pressure, bounce back increases, the percent rejection goes up, progressively less alcohol is removed at each pass, and the process becomes figuratively "infinitely" long in time. In contrast, in the process of this invention the pressure can be maintained relatively constant throughout the process, yet process time does not become overly long and the number of passes does not become excessive because the permeability is higher and bounce back/rejection is lower. Because pressure does not have to be increased, there are process economies.

The process if this invention can employ conventional both polyamide (or polyamide/polysulfone) or cellulose acetate thin films, although the polyamide thin films the preferred membrane. See, for example, U.S. Pat. No. 4,612,196 (and references cited therein), U.S. Pat. No. 4,499,117 and GB 2,133,418A for suitable films.

The reverse osmosis water added is a volume balanced amount. That is, it equals the amount of the permeate where all of the retentate is recycled to the feed tank. If a portion of the retentate is drawn off and the balance recirculated, then the amount of water proportionate to the retentate withdrawn is not added. That is, the amount of make-up water is proportionately reduced. The water added equals both the water and alcohol removed, not just the water, so the flavor, aroma and color solids solutes are in concentration in the finished wine equal to that in the initial feedstock wine.

DRAWING

The FIGURE is a schematic illustration of the process of this invention to produce low and non-alcoholic beverages products, particularly wine, as well as secondary and tertiary products.

DETAILED DESCRIPTION OF THE BEST MODE

The following detailed description illustrates the invention by way of example rather than by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Referring now to the Figure, the process of this invention involves supplying a traditionally fermented wine feedstock 1 to an insulated, preferably chilled, holding tank 2. The wine is then fed via line 3 at high pressure developed by pump 4 to a reverse osmosis unit 5 identified in the Figure as "RO UNIT B". The reverse osmosis unit 5, described in appropriate detail below, includds a spiral wound cartridge having alternating layers of reverse osmosis membranes and plastic separator screens disposed "concentrically" around a hollow core. The wine enters one end of the cartridge under pressure, flow tangentially along the membrane (i.e., parallel to the cartridge axis), and the permeate, in this case, alcohol and water not rejected by the chemistry of the membranes, flows under pressure through the membranes into the permeate channels and spirals into the central core. The retentate flows out at the opposite end of the cartridge while the permeate exits the downstream end of the core.

Unlike the process of ultra filtration, where the various species of the solute pass are rejected on the basis of size or molecular weight, in reverse osmosis there is an interaction between the membrane material, the solvent (water or alcohol) and the solute (the wine flavor, color solids and aroma constituents).

Typical thin films which can be used in the process of this invention range from cellulose acetate to a thin film composite (TFC) membrane having a support layer of polysulfone, a barrier layer of a polymer prepared from a polyamine, or polyamine and a polyacyl, and a fiber backing. The TFC membrane has a mocular weight cutoff of about 100 amu. A typical membrane would be that employed in a Millipore brand FT 30 cartridge. This cartridge has a nominal MW limit of 100, and rejects 98% and 99%, respectively, of standard rejection markers NaCl and Mg $SO_4$ @ 2000 ppm.

Typical rejection characteristics of two common reverse osmosis membranes which can be used in this process are as follows:

TABLE 1

| Solute Type | Percentage Rejection Membranes | |
|---|---|---|
| | Cellulose Acetate | Polyamide |
| Formaldehyde | 13 | 58 |
| Diethyl Ether | 12 | 36 |
| Ethanol | 1 | 28 |
| Methanol | 14 | 45 |

Where the input pressure is approximately 500–700 psi into the wine side reverse osmosis unit (RO unit B), the pressure drop across the unit will be on the order of 25–150 psi, preferably 40–50 psi. The feed wine in tank 2 is maintained at approximately 50 degrees F. throughout the processing by means of a heat exchanger 6 which removes absorbed ambient heat from the recycling retentate by means of cold water, chilled glycol or the like. The retentate exits from the reverse osmosis unit 5 via line 7, passes through pump 8, heat exchanger 6 if necessary, and back into the feed tank 2 via return line 9. Approximately 40% of the alcohol goes through the membrane at each pass. Where desired, various fractions of the retentate can be drawn off as tertiary products via line 10.

Exiting from the core of the reverse osmosis unit 5 via line 11 is the permeate which comprises alcohol (ethanol) and water. This permeate may be stored in a temporary holding tank 12 which is tapped off from time to time via line 13 as secondary products. The process exhibits a characteristic percentage of alcohol versus time curve which is generally bell-shaped. At the beginning of the process, for the first few passes through the reverse osmosis unit 5, the permeate alcohol content is quite high. Subsequently it falls off rapidly, after which the alcohol yield (volume percentage of alcohol in the permeate) drops gradually over an extended period of time. Initially, where the permeate has a greater than 10% ethanol, this secondary product can be processed to produce vinegar. It can also be sold as such as "wine spirits", and has a unique, dry "vodka-like" quality. In some instances, the volatile acidity is relatively high (pH low) as the membrane can pass acid components, thus giving the "wine spirits" product a distinct "tang".

Subsequent permeate fractions at lower than 10% ethanol content can be processed by distilling for recovery of the alcohol or back blending for brandies and the like.

The recycled retentate $R_R$ is pumped back into the feed tank 2 via line 9 at a pressure on the order of 450-500 psi. Where no tertiary products are being taken off at line 10, the quantity of the permeate drawn off line 11 is monitored at volumetric monitor/controller 14. Where tertiary products are drawn off at line 10, volumetric/controller monitor 15 may be used to verify the amount of retentate being recycled to the feed tank 2.

Simultaneously, feed water 16 is pumped via pump 17 through reverse osmosis unit 18, termed RO Unit A, at a pressure on the order of 500-700 psi. As with the feedstock wine, the feed water is input at approximately 50-60 degrees fahrenheit. The temperature can be controlled and maintained by means of heat exchanger 19. The pump 17 develops 500-700 psi, and the pressure drop across the RO Unit A to water output line 20 is on the order of 40-50 psi. Waste water may be routed via line 21 to a drain. The volume of the water being input into the inprocess wine in feed tank 2 is monitored and controlled by volumetric monitor/controller 22.

The input water $W_I$ is controlled to equal the amount of output permeate $P_O$ in cases where no tertiary products are taken off as fractions. Or $W_I$ is controlled to equal the volume of water needed to restore the recycled retentate $R_R$ to original volume where tertiary products are withdrawn via line 10. This procedure helps to prevent the rejection of alcohol by the membrane where the alcohol content drops below about 5%. It is also preferred, but not absolutely required, to maintain a $CO_2$ head over the feed and inprocess wine to prevent water loss and oxidation. Finished wine is withdrawn via line 23.

The following examples employed the process as above-described.

EXAMPLE 1

The process apparatus was set up as shown in the figure. The water side RO Unit A employed a Millipore brand CDRCM60S1 cartridge whereas the wine side RO Unit B employed a Millipore brand MSD625W6 cartridge. Both employed reverse osmosis membranes consisting of a very thin film (0.1-0.5 $\mu$m) polyamide semipermeable membrane integrally bonded to a plastic separator support screen. The nominal molecular weight limit was 100 amu. The initial feedstock consisted of 10,000 gals. of a red field wine of 11-12% by volume alcohol at 50 degrees F. The range of operation is typically 35-55 degrees F. with the preferred being 45-50 degrees F. The input pressure into the wine side RO Unit B was approximately 600 psi, with the output in the range of 470-545 psi. Simultaneously, 40,000 gals. of water in the temperature range of 50-65 degrees F. was input into the feedstock wine at the same rate the permeate was withdrawn out the axial core of RO Unit B. Thus the volume balance was 10,000 gals. of product after some 3 to 4 total volume exchanges producing 40,000 gals. of permeate.

Of the 40,000 gals. of permeate, the first fraction of about 10,000 gals. proved to have an average alcohol content of about 10%, where the initial feed wine alcohol was in the range of 11-12%. Accordingly, the first 8,000-10,000 gals. of wine can be saved for vinegar production. The second fraction of 20,000-25,000 gals., averaging approximately 5% alcohol, can be employed for brandy production. The volumetric output was monitored at both the permeate output line 11 and the water input line 20. The water input was carefully controlled to continuously balance the output at the permeate side of the RO Unit B and maintain the wine inprocess at the initial feedstock volume. Some 25 to 40% of the alcohol was passed at the pressures maintained on the RO Unit B input side. It took approximately 15 days for the entire processing of the original 10,000 gals. of field wine to produce the 10,000 gals. of non-alcoholic finished wine product and during this period 3-4 total volume changes took place. The final product had an alcohol content of below 0.01%, and was evaluated as having flavor, aroma and color solids similar to alcoholic wine. It is a finished wine acceptable in good commerical practice.

EXAMPLE 2

As in Example 1, 10,000 gallons of a white field wine was processed to produce a non-alcoholic product of excellent aroma and flavor.

EXAMPLE 3

A blend of Johannisberg Reisling, Chenin Blanc, Gewurtztraminer, and Muscat Canelli were used as the feedstock wine in the process described in Example 1. The resulting non-alcoholic wine was involved in a blind taste test by experts who compared it against wines with alcohol at the Los Angeles County (CA) Fair on Aug. 25, 1986 and won a Gold Medal. The experts were unaware that the wine was non-alcoholic.

It should be understood that various conventional additives may optionally be included in the final product by mixing in the tank or in the recirculating product line during processing. This can include carbon dioxide, in the final product, at a typical concentration of not more than 0.392 grams per 100 millimeters. In addition, grape juice or grape juice concentrate can be added to adjust the residual sugar to 1-6 grams per 100 milliters. Also, sulphur dioxide can be used to retard spoilage, and to protect the natural flavor and color in the wine. $SO_2$ is used at levels of not more than 350 parts per million in the final product. Likewise the acidity of the wine can be adjusted for taste by the winemaker.

It should be understood that various modifications within the scope of this invention can be made by one of ordinary skill in the art without departing from the spirit thereof. I therefore wish my invention to be defined by the scope of the appended claims as the prior art will permit, and in view of the specification if need be.

I claim:

1. A method of reducing the alcohol content of a fermented alcoholic beverage comprising the steps of:
   (a) withdrawing from a holding tank over a period of time an initial volume of fermented alcoholic beverage and subjecting said withdrawn beverage to a first reverse osmosis to produce beverage retentate and beverage permeate fractions;
   (b) returning at least a portion of said beverage retentate fraction to said holding tank to mix with remaining beverage in said holding tank to produce an in-process beverage fraction in said holding tank;
   (c) volumetrically monitoring the beverage permeate fractional removed;

(d) subjecting water to a second reverse osmosis to produce a purified permeate water fraction and a retentate water fraction;

(e) continuously adding said permeate water from said second reverse osmosis to said beverage in-process fraction in said holding tank in an amount substantially equal to said beverage permeate fraction, less an amount corresponding to beverage retentate not returned to said in-process beverage fraction, to maintain the volume of the remaining in-process beverage fraction in said tank substantially equal to said initial volume;

(f) subjecting said in-process beverage fraction to repeated passes through said first reverse osmosis step (a) and recycle step (b) while maintaining said first and second reverse osmosis for a period sufficient to reduce said alcohol content of said in-process beverage fraction to a desired level;

(g) monitoring the alcohol content of said in-process beverage fraction in said tank; and (h) withdrawing a primary product beverage from said tank when said in-process beverage in said tank has had its alcohol content reduced to the desired reduced alcohol level.

2. A double reverse osmosis process as in claim 1 where said beverage is wine.

3. A double reverse osmosis process as in claim 2 wherein said recycle of said in-process beverage through said first reverse osmosis is maintained for a period sufficient to produce wine having an alcohol level below about 0.5% by volume.

4. A double reverse osmosis process as in claim 34 wherein said alcohol level is below about 0.01% by volume.

5. A double reverse osmosis process as in claim 2 wherein said wind reverse osmosis employes a thin film composite membrane of a polyamide supported on a polysulfone.

6. A double reverse osmosis process as in claim 5 wherein said reverse osmosis is maintained for a period sufficient to produce wind having an alcohol level below about 0.5% by volume.

7. A double reverse osmosis process as in claim 6 wherein said alcohol level is below about 0.01% by volume.

8. A double reverse osmosis process as in claim 6 wherein said initial feed wine and in-process beverage fraction are maintained at a temperature in the range of from about 35°–55° F., the first reverse osmosis is maintained at a pressure drop P in the range of from about 25–150 psi, and said first reverse osmosis and recycle steps are maintained for from about 3 to about 4 total exchanges of volume of said initial feed wine at a rate of up to about 15 days per 10,000 gallons of initial feed wine.

9. A double reverse osmosis process as in claim 8 wherein said alcohol content of said dproduct wine is below about 0.01% by volume.

10. A method of overcoming 5% alcohol rejection barrier bounce back comprising subjecting a fermented beverage to the steps of claim 1.

* * * * *